United States Patent [19]
Audesse et al.

[11] 3,732,416
[45] May 8, 1973

[54] DISCLOSING LIGHT

[75] Inventors: Emery G. Audesse, Salem; Arnold E. Westlund, Jr., Manchester; Tadius T. Sadoski, Salem, all of Mass.

[73] Assignee: GTE Sylvania Incorporated, Danvers, Mass.

[22] Filed: Nov. 26, 1971

[21] Appl. No.: 202,538

[52] U.S. Cl..................240/41.15, 128/23, 240/1 A, 313/109 R
[51] Int. Cl.................................A61b 1/06
[58] Field of Search.................240/11.4 R, 41.15, 240/46.49 R, 1 A; 128/11, 23; 313/109 R; 252/301.4 F

[56] References Cited

UNITED STATES PATENTS

| | | | |
|---|---|---|---|
| 3,544,481 | 12/1970 | Barry | 252/301.4 F |
| 3,435,206 | 3/1969 | Slvanson | 240/11.4 R |
| 3,599,028 | 8/1971 | Wanmaker et al | 313/109 |
| 2,953,675 | 9/1960 | Kluge | 240/11.4 (R) XR |
| 1,844,588 | 2/1932 | Meitzler | 128/23 |
| 2,135,690 | 11/1938 | Addink et al | 240/11.4 R XR |

Primary Examiner—Samuel S. Matthews
Assistant Examiner—Fred L. Braun
Attorney—Norman J. O'Malley et al.

[57] ABSTRACT

A lighting device for viewing calculus, (plaque), tartar, and the like on a person's teeth, the device utilizing a fluorescent lamp with a phosphor such as calcium strontium magnesium silicate, activated by europium, to emit light mainly in the 400 to 520 nanometers wavelength region, that is in the blue and green region, but not the yellow, to produce a yellow fluorescent emission from any calculus or tartar on the teeth. The teeth are first treated with a fluorescent material such as a weak sodium fluorescein solution to provide the calculus with phosphor material. In viewing, it is best to use a filter which excludes blue and green light in order to make the amount of reflected light from the part of the teeth which do not have calculus on them as small as possible. This can be done by viewing the teeth in a dichroic reflector which passes blue and green but reflects yellow. The device can also be used for viewing other parts of the body, and for other purposes.

2 Claims, 4 Drawing Figures

DISCLOSING LIGHT

BACKGROUND OF THE INVENTION

1. Field of the Invention

This invention relates to electric lighting devices, especially to devices for viewing teeth to determine the presence of calculus, sometimes called plaque, tartar and other undesirable matter on the teeth.

2. Summary of Prior Art

It has been known to treat the teeth, or other parts of the body to be observed, with a fluorescent material, a small drop generally being sufficient for use on teeth, and the resultant fluorescence observed. Sodium fluorescein is often used. Such materials generally respond to ultraviolet light, or to the blue region of the visible spectrum. Since the teeth themselves fluoresce blue under ultraviolet excitation, the use of ultraviolet has been found undesirable as the exciting radiation. As pointed out in our copending application Ser. No. 141,742 filed May 10, 1971 it is desirable to use a blue exciting radiation which gives a yellow fluorescence with the phosphor used. An incandescent lamp with filtered light has been used.

SUMMARY OF THE INVENTION

We have found that a fluorescent lamp can be used as the source of exciting radiation, and a phosphor giving mainly light which excites the phosphor on the teeth can be used in the lamp thereby obviating the need for filtering out the undesired light from the lamp. This results in a simpler device optically, and one in which the lamp will have the long life characteristic of fluorescent lighting.

We have found that europium-activated calcium strontium magnesium silicate can be used, and has the approximate chemical formula $$Ca_{1.5}Sr_{1.5}MgSi_2O_8:Eu(0.04)$$

the subscripts and the number in parenthesis being on a gram-atom basis.

DESCRIPTION OF THE EMBODIMENTS

Other objects, advantages and features of the invention will be apparent from the following specification taken in connection with the accompanying drawings in which.

Figure 1:
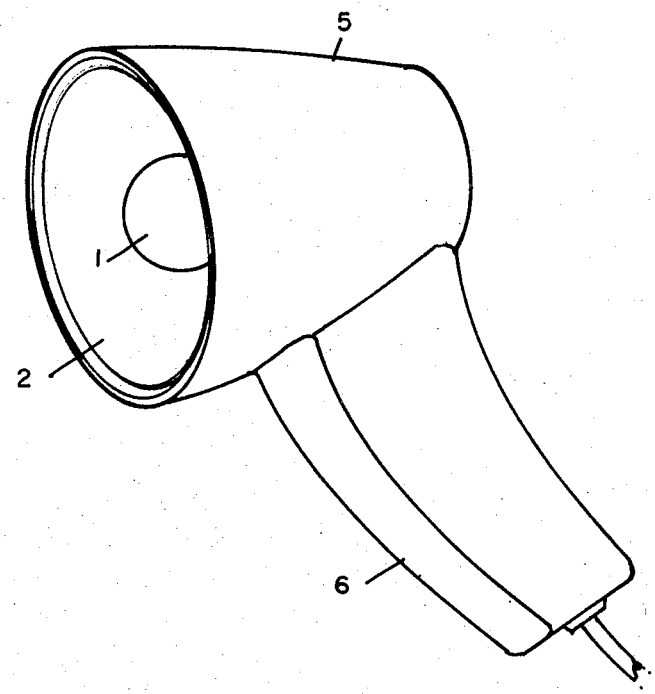
FIG. 1 is a perspective profile of a device according to an embodiment of the invention.
Figure 2:
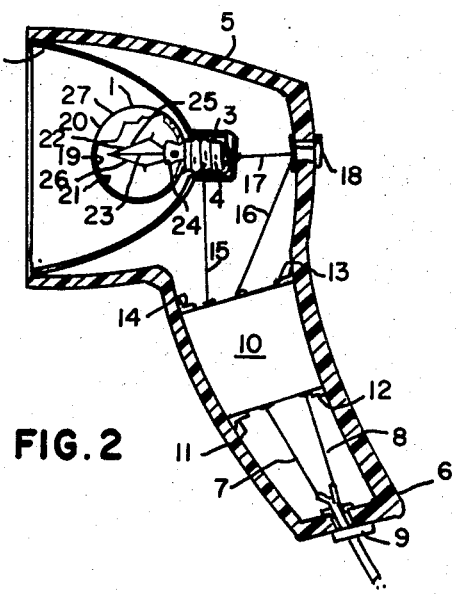
FIG. 2 is a sectional elevation of the same device.

In the figures, the lamp 1 is held near the focal point of reflector 2 by the screw-type socket 3, the particular lamp shown having a screw base 4, although other types of bases can be used, with their corresponding sockets. The reflector 2 can be held in an outer plastic casing 5 somewhat conical shape, if desired, and the hollow handle 6 extends from the wall of the casing 5.

A pair of electrical conductors 7,8, which can be the usual insulated wires, extends through a bushing 9 and is connected to a transformer 10 of the usual type for operating the lamp used, preferably a compact transformer. Brackets 11, 12, 13, 14 hold the transformer in place in the handle 6, the output of the transformer being connected to the base 4 by the wires 15, 16, 17, the circuit through 16, 17 including a series switch 18 for turning the lamp 1 on and off.

The lamp 1 can be of the well-known G4S11 type of ultraviolet lamp but with a coating 19 of phosphor on the inner surface of the glass bulb 20. The usual G4S11 does not have this phosphor coating 19, and gives off mainly ultraviolet light; but the phosphor in the present lamp converts this ultraviolet light interiorly of the lamp into the proper visible light, and the bulb can consequently be of a glass which does not transmit ultraviolet light, and is preferably of a type which absorbs ultraviolet light which may pass through the phosphor coating 19. We have used ordinary lamp lime glass.

The lamp 1 has a hollow glass envelope 21 which can be spherical, sealed into which is a V-shaped filament 22 of coiled tungsten wire, supported at the apex of the V by support wire 23 emanating from stem 24, through which filament support wires 25, 26, pass. The bulb contains a filling of argon at about 3 mm pressure, and a drop of mercury.

There is a phosphor coating 27 on the inside surface of the envelope 21, the phosphor being the calcium strontium magnesium silicate whose formula is given above. The ends of the filament are coated with electron-emitting alkaline earth oxides in the usual manner, and the remainder of the filament is coated with an insulating material such as zirconium dioxide as is customary. The lamp operates at about 10.5 volts and about 0.350 amperes.

Other configurations and types of fluorescent lamps can be used as long as their radiation is confined to the proper wavelength and as long as they cooperate properly with the reflector to produce the light pattern desired. However, the type shown is especially effective.

The phosphor can be calcium strontium magnesium silicate, activated by europium, and is given approximately by the formula $$Ca_{1.5}Sr_{1.5}MgSi_2O_8:Eu(0.04)$$

where the proportions are in gram-atoms, including the 0.04 for europium.

Figure 3:
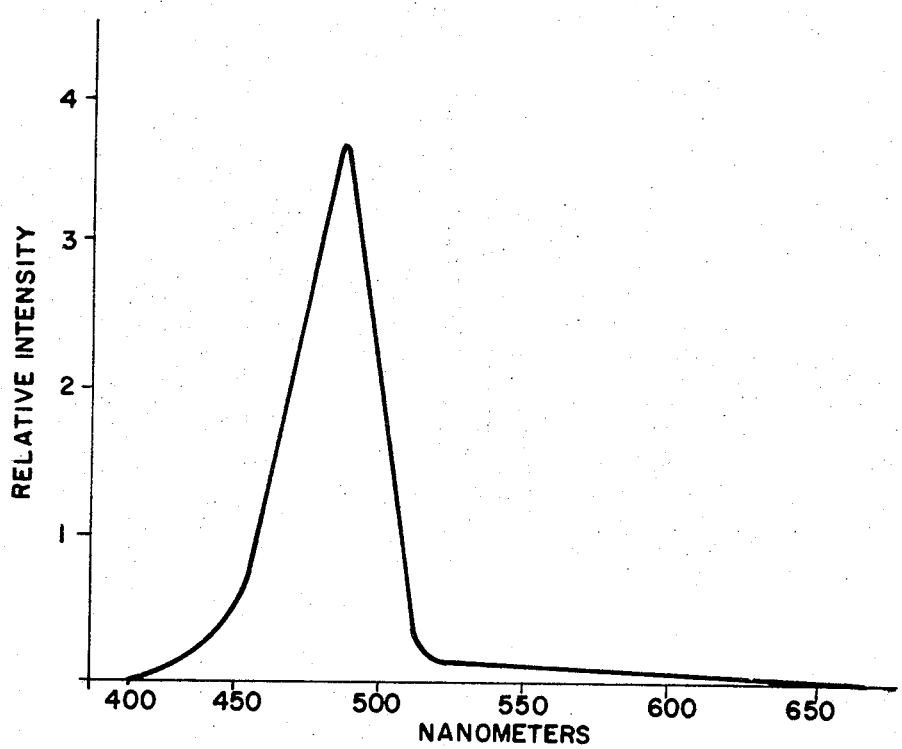
FIG. 3 is a curve of excitation vs. wavelength of light falling on sodium fluorescein.

In FIG. 3, the relative excitation of the phosphor used on the teeth is plotted against the wavelength of the exciting light in nanometers. There is seen to be very little excitation below 400 nm. and none above 520 nm., the excitation curve rising sharply in between these limits.

Figure 4:
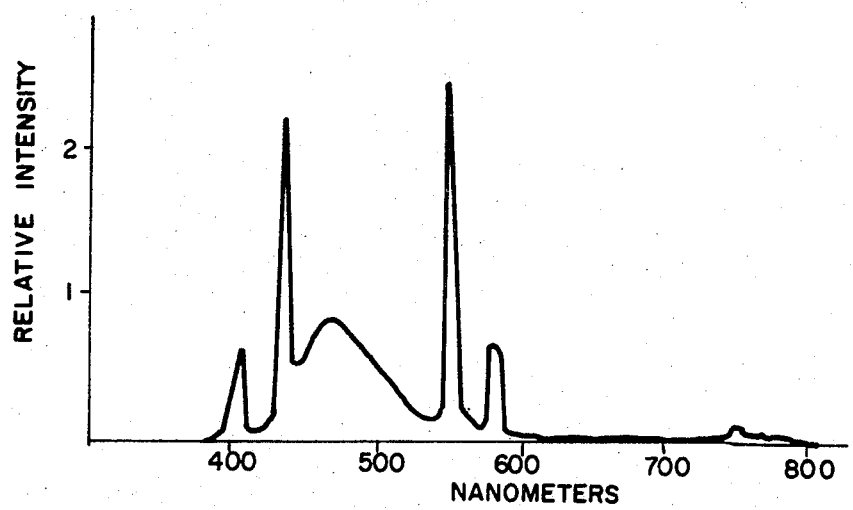
FIG. 4 is a spectral energy distribution curve of the emission from the lamp used.

FIG. 4 shows the spectral energy distribution of the light emitted from our device. The plot is for relative energy intensity against wavelength in nanometers. The sharp peaks are due to emission from the mercury in the lamp, the wider peak is emission from the fluorescent coating.

The greater portion of the energy is seen to be between 400 and 520 nanometers (nm), with a small mercury emission at about 577 nm and a higher mercury emission at 546 nm. These are of too high wavelength to affect the phosphor used on the teeth, and because of the narrow energy region, the energy is too low to produce sufficient reflected light from the teeth in the emission range to conflict with the fluorescent light from the teeth. The transformer operates the lamp at a filament temperature such that the light emission from the filament is small compared to that from the phosphor and mercury.

The effectiveness of the device can be improved by mounting on the top of the housing a dichroic reflector as in copending application Ser. No. 141,742, filed May 10, 1971 by E. G. Audesse and A. E. Westlund, Jr., which reflects yellow light and transmits as much as possible of other light to prevent its interference with the yellow light from the fluorescence of the phosphor on the teeth as observed by the user. The reflector can have a backing shield to prevent stray light from reaching the eye of the observer through the back of the reflector.

Although a specific embodiment of the invention has been described, various modifications and alterations can be made without departing from the spirit and scope of the invention, which is limited only by the claims.

What we claim is:

1. A disclosing light for viewing teeth comprising: a fluorescent lamp having an envelope which transmits visible light but absorbs ultraviolet light, said lamp having contact terminals and a coiled tungsten wire filament therein, said filament having a coating of electron-emissive material over at least part of its length and being connected between the terminals to act as an electrode; a reflector in position to reflect light forwardly from said lamp; a housing for said lamp and reflector, said housing having a handle; a transformer in said housing for operating said lamp to produce an ultraviolet-emissive electric discharge therein; and a phosphor coating on the inside surface of said lamp envelope for transforming the ultraviolet light from said discharge into visible light of wavelengths mainly in the 400 to 520 nanometer range, said phosphor being calcium strontium magnesium silicate activated by europium, said transformer operating the filament at a temperature such that its light emission is small compared with that from the phosphor and mercury.

2. The light of claim 1, in which the envelope contains mercury vapor through which the electrical discharge may pass, said mercury vapor during operation of the lamp being such that the mercury radiation above 520 nanometers is small compared with the phosphor and mercury radiation between 400 and 520 nanometers, the ultraviolet light below 400 nanometers being largely absorbed by the glass envelope.

* * * * *